June 29, 1954   H. B. BARNET   2,682,086
DEVICE FOR STRIPPING GARNETTING MACHINES
Filed June 23, 1949   2 Sheets-Sheet 1

Inventor:
Henry B. Barnet,
by *Aubrey H. Smith*
His Attorneys

June 29, 1954   H. B. BARNET   2,682,086
DEVICE FOR STRIPPING GARNETTING MACHINES
Filed June 23, 1949   2 Sheets-Sheet 2
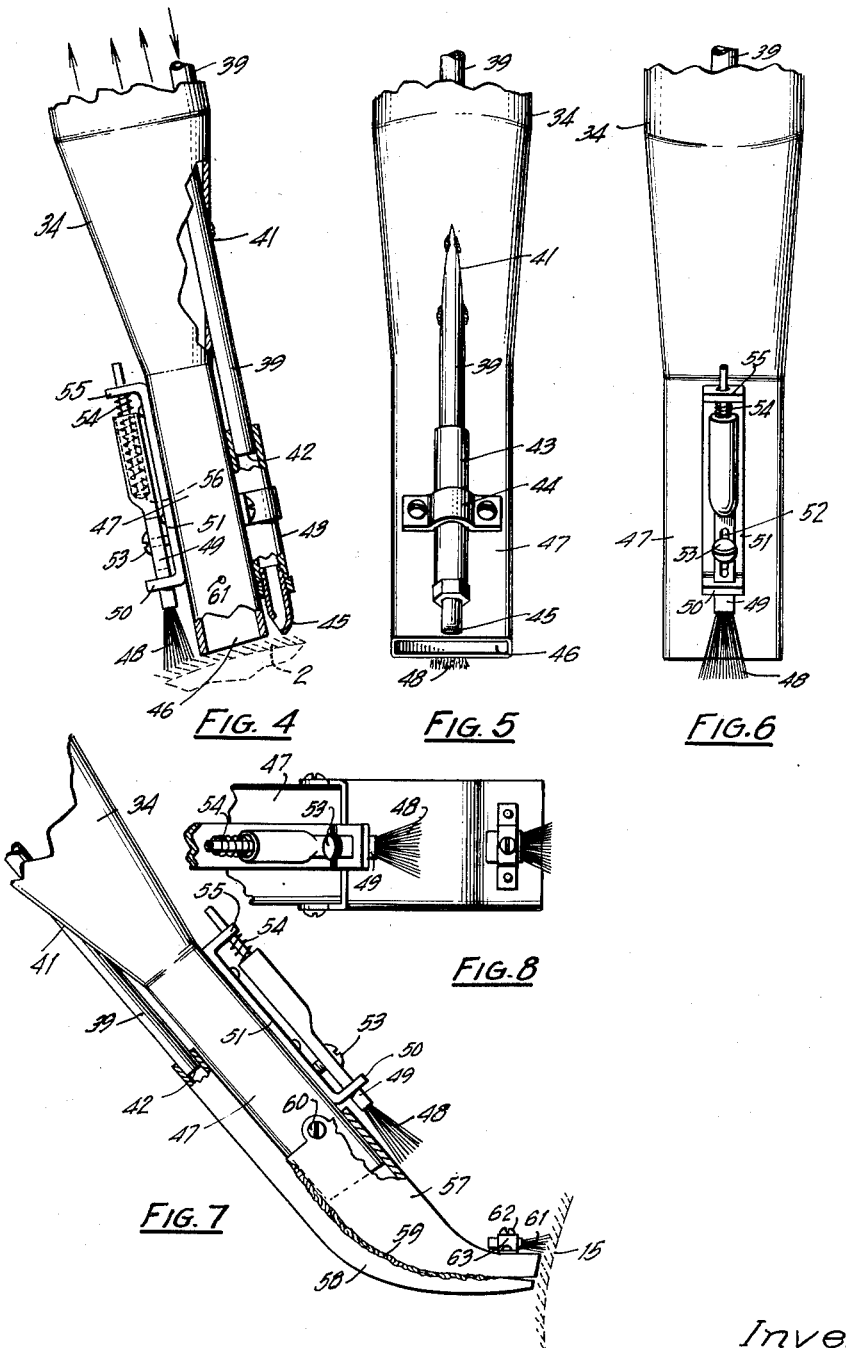
Inventor:
Henry B. Barnet,
by
His Attorneys Patented June 29, 1954

2,682,086

UNITED STATES PATENT OFFICE 2,682,086

DEVICE FOR STRIPPING GARNETTING MACHINES

Henry B. Barnet, Albany, N. Y.

Application June 23, 1949, Serial No. 100,942

7 Claims. (Cl. 19—109)

My invention relates to garnetting machines and particularly to improvements in the device disclosed in my copending application, Serial No. 767,151, now abandoned.

Garnetting machines which are used in the preparation of wool and other fibers are provided with various rolls or cylinders referred to in the art as main cylinders, doffers, workers, strippers, fancies, fancy strippers, and angle strippers, all of which are provided with sharp, rigid teeth on the surface thereof formed in a wire which is helically wound around the cylinder. The teeth are spaced both circumferentially and longitudinally of the surfaces of the rolls and, in operation, the spaces between and beneath the teeth become so filled with oily dirt, fibers, and other foreign matters encountered in the treatment of the wool and other fibers that they must be frequently cleaned by stripping the accumulated dirt, etc., from the surfaces thereof.

Prior to the invention disclosed in my said application it was necessary to strip all of the material working surfaces of a garnetting machine by hand while these surfaces were in motion; the usual method being to hold a piece of card clothing, called a hand card, against the moving surfaces to comb or pull the dirt and fibers therefrom. The cylinder and doffer were cleaned from underneath and the cleaning was a particularly hazardous task due to the sharp, rigid teeth on the surfaces thereof which are very much different from the flexible wires on the surfaces of a card. Men were frequently caught by these teeth, drawn into the machine, and killed or very seriously mangled thereby.

While the main cylinder and doffer are perhaps the most hazardous and difficult to strip, there are other material working surfaces such as the workers, the strippers, the fancies, the fancy strippers, and the angle strippers which must be stripped from time to time. In order to strip these last mentioned surfaces it is still necessary for the operator to stand on the machine and use a hand-held stripping unit which is also a very hazardous operation.

The principal object of my invention, therefore, is to provide a means for stripping all of the working surfaces of the garnetting machine, including the main cylinder and doffer, which can be employed without danger to the operator because it eliminates the necessity of the operator crawling underneath the machine or standing thereon.

In my copending application aforesaid, I have disclosed a stripping mechanism which is adapted to strip only the main cylinder and doffer. This device includes a traversing mechanism having a level winding carriage screw therein which moves the stripping unit back and forth transversely of the machine. The traversing mechanism is mounted on trunnions at opposite sides of the machine about the axis of which said mechanism may be swung to bring the stripping unit into operative relation either with the surface of the main cylinder or the surface of the doffer. The axis of the carriage screw however, is parallel to and offset from the axis of the trunnions so that, when the device is swung on the trunnions, the axis of the carriage screw may be said to describe a cylindrical surface coaxial with the trunnions. As illustrated in said application, the carriage screw has a pulley thereon which is turned by means of a belt cooperating with a driving pulley. The result of this arrangement is that, when the stripping mechanism is swung about the axis of the trunnions from a position in operative relation to the surface of the main cylinder to a position in operative relation to the surface of the doffer, or vice versa, the distance between the driving and driven pulleys is changed, and adjustments must be made so that the length of the driving belt, which is, of course, fixed, is the same in each position. Another object of my present invention, therefore, is to provide an improved mechanism for driving the carriage screw which will eliminate the necessity of adjusting the distance between the driving and driven pulleys to conform to the length of the driving belt when the stripping unit is moved from one surface to another. Another object is to provide an improved stripping unit including a vacuum nozzle, a compressed air nozzle, and a brush, which may be used not only for stripping the main cylinder and the doffer but also for stripping the fancy, the fancy stripper, and all of the workers and strippers. Another object is to provide an improved stripping unit in which the compressed air nozzle is disposed in a novel and better way with respect to the vacuum nozzle.

Since it is difficult so to position the traversing mechanism that the stripping unit may be brought into operative relation with respect to all of the workers and strippers in their normal positions, another object is to provide a means in which a worker or stripper which has been removed from its normal position may be supported within operative range of the stripping unit so that it may be stripped thereby. A further object is to provide a means for automatically stopping and holding the stripping unit after it has been swung into operative relation with respect to the various surfaces to be stripped.

I attain these objects by means of the novel elements and the combinations and arrangements thereof described below and illustrated in the accompanying drawings in which—

Fig. 4 is an enlarged fragmentary side elevation view of a stripping unit, partially in section and with portions broken away, which is adapted to strip the main cylinder and doffer;

Fig. 5 is a right hand side elevation view of the device as shown in Fig. 4;

Fig. 6 is a left hand side elevation view of the device as shown in Fig. 4;

Fig. 7 is a fragmenary side elevation view of a nozzle, such as shown in Figs. 4, 5 and 6, showing attached thereto an auxiliary nozzle adapted for stripping the fancy, the fancy stripper, the angle stripper, and several of the workers and other strippers; and Fig. 8 is a top plan view of the parts shown in Fig. 7.

Figures 1, 2, 3:
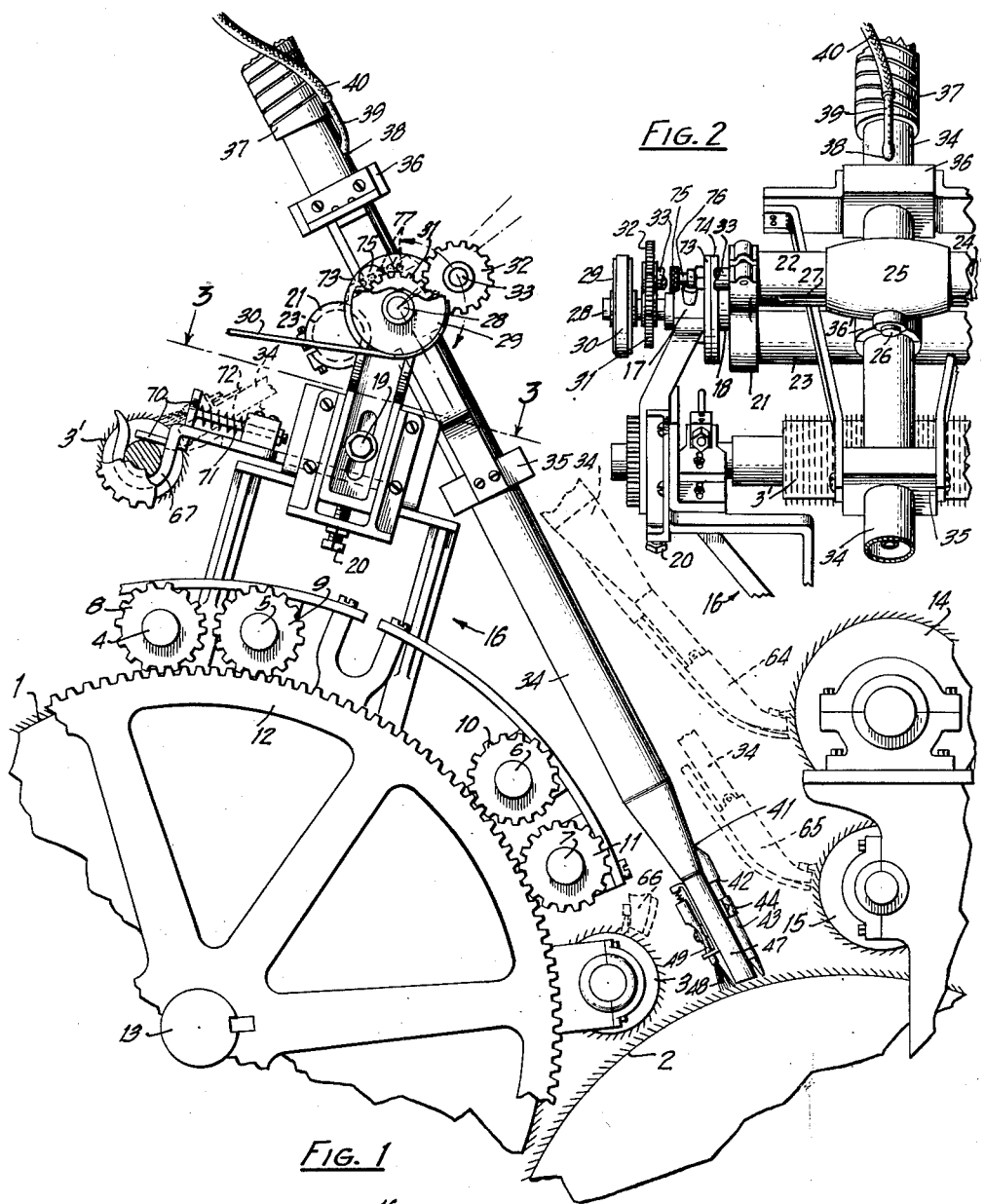
Fig. 1 is a fragmentary side elevation view of a garnetting machine showing, in solid outlines, my stripping mechanism in operative relation to the doffer, and, in dotted outlines, in operative position with relation to the angle stripper, a worker or stripper supported in a position out of its normal position, the fancy, and the fancy stripper.
Fig. 2 is a fragmentary side elevation view of a portion of Fig 1.
Fig. 3 is a section of Fig. 1 in the plane 3—3.

Referring to the drawing and first to Figs. 1 and 2, 1 is the main cylinder of the garnetting machine, 2 is the doffer, 3 is the angle stripper, and 4, 5, 6 and 7 are shafts on which other workers and strippers are mounted; said workers and strippers being driven by the spur gears 8, 9, 10 and 11, respectively, in mesh with the large gear 12 on the shaft 13 of the main cylinder. 14 is a fancy and 15 is a stripper for the fancy.

Mounted on brackets, represented generally by the numeral 16 which are supported on opposite sides of the frame of the machine (not shown), are bearings 17 in which the trunnions 18 of a traversing mechanism are rotatably mounted. These bearings may be raised and lowered by loosening cap screws 19 and tightening or loosening adjusting screws 20. Insofar as the traversing mechanism is concerned, it may be substantially identical with the traversing mechanisms employed in stripping carding engines. That is to say, a yoke 21 in which the trunnions 18 are mounted carries a transversely-extending pair of parallel-disposed tubes 22 and 23 in one of which, 22, is mounted a level winding carriage screw 24, a fragmentary portion of which is shown in Fig. 2. Slidably mounted on the tube 22 in which the carriage screw is mounted is a sleeve 25 having a pin 26 therein which passes through the slot 27 and engages the carriage screw so that the sleeve 25 and the various parts carried thereby are moved back and forth transversely of the machine when the stripping mechanism is in operation.

Mounted on a shaft 28 having a bearing in or coaxial with one of the trunnions 18 is a pulley 29 driven by the belt 30 from a motor or other suitable source of power (not shown). Secured to the shaft 28 is a gear 31 which meshes with the gear 32 on the shaft 33 of the carriage screw 24. Thus, when the pulley 29 is driven, gear 31 will drive gear 32 and effect the rotation of the carriage screw. Since the gear 32 is disposed in planetary relation with respect to the gear 31, it will be apparent that the traversing mechanism may be swung in any direction about the axis of the trunnions without interfering with the cooperation of the gears 31 and 32.

Carried by the traversing mechanism and moved back and forth transversely of the machine by means of the carriage screw 24 is the stripping mechanism comprising the vacuum tube 34 which is slidably and rotatably mounted in bearing blocks 35 and 36. The vacuum tube also passes through a split sleeve 36' in which it can be clamped by means (not shown) but which may be similar to the means shown in my copending application aforesaid, or, for example, by a set screw which could be threaded into either of the blocks 35 and 36 and bear on said tube. The vacuum tube 34 is shown as attached to a flexible hose 37.

Entering the vacuum tube 34 at 38 is a compressed air pipe 39 which is shown as connected to a flexible hose 40 adapted to communicate with a source of compressed air. The pipe 39 extends downwardly through the inside of vacuum tube 34, emerges therefrom at 41 (see Fig. 1 and Figs. 4, 5, 6 and 7), and terminates at 42 a short distance below its point of emergence from the tube 34. Communicating with the lower end 42 of the compressed air pipe 39 is a nozzle 43 which may be merely inserted in the end of the pipe 39 as shown in Fig. 1 or fitted over the end of said pipe, as shown in Figs. 4 and 5. The nozzle is held in position by means of a strap 44 secured to the nozzle of the vacuum tube. At its lower end, the compressed air nozzle is preferably slightly curved, as shown at 45 in Figs. 4 and 5, so that the air discharged therefrom is directed toward or across the open inlet end 46 of the vacuum tube.

On the side opposite the air nozzle 43, there is secured to the nozzle 47 of the vacuum tube a wire brush 48 the bristles of which are set in an elongated handle-like element 49 which extends through the leg 50 of a bracket 51 in slidable relation thereto. There is a slot 52 in the element 49 through which a screw 53 extends to hold the brush in place and still allow it to slide axially. The upper end of the element 49 is recessed and there is disposed therein a helical spring 54 which is compressed between the other outstanding leg 55 of the bracket 51 and the bottom 56 of the recess. Thus, the spring 54 is biased to force the wire brush downwardly against the surface to be stripped which, as illustrated in Figs. 1 and 4, is the doffer.

The nozzle and brush arrangement, as shown in Figs. 4, 5 and 6, and in solid outlines in Fig. 1, is adapted to strip either the doffer or the main cylinder.

In order to strip some of the workers and strippers without removing them from the garnetting machine, and also the fancy, the fancy stripper, and the angle stripper I have provided auxiliary nozzles, or an auxiliary nozzle assembly, as best shown in Fig. 7. As there illustrated, 57 is the vacuum nozzle and 58 is the compressed air nozzle which may be welded or otherwise secured together as shown at 59 to form a unitary assembly. These auxiliary nozzles are curved as shown so that, whey they are attached to the straight nozzle on the vacuum tube 34 and to the end of the compressed air pipe 39, by merely slipping them thereover and securing them by means of the screw 60 which passes through a threaded opening 61' (see Fig. 4) in the straight nozzle on the vacuum tube, they are disposed in proper stripping position with respect to the fancy, the fancy stripper, the angle stripper 3, and some of the workers and strippers, as shown in dotted outline at 64, 65 and 66 in Fig. 1. The brush 48 is not removed, but another wire brush 61 is secured to the curved nozzle assembly by means of a set screw 62 extending through a strap 63 secured to the top of the vacuum nozzle.

In order to strip the workers and strippers which cannot be reached by the mechanism as described above, I have provided bearings 67 on opposite sides of the machine which are attached to the brackets 16 by means of the cap screws 68 and 69 (see Fig. 3). Workers which are inaccessible for stripping by the mechanism described above may be removed from the machine and supported in the bearings 67 where they will be within operative range of said mechanism. In order to hold the workers and strippers in the bearings 67 during the stripping operation, I have provided latches 70 which are normally projected over the bearings of the worker by means of helical compression springs 71. The stripping unit in operative relation to a stripper 3' in the brackets 67 is shown in dotted outlines at 72 in Fig. 1. The workers or strippers, when supported in the bearings 67 may be rotated during the stripping operation by means of an air or electric drill held in cooperative relation with one end of the shaft associated therewith.

Since the stripping unit must be moved to various positions in operative relation to the various surfaces to be stripped, it is very convenient to have some means whereby the stripping unit, when so moved, may be automatically locked in proper position.

To accomplish this end, I have provided a circular metal disk 73 (see Figs. 1 and 2) which is rigidly affixed to one of the brackets 16. A second disk 74 coaxial with and in running contact with the disk 73 is affixed to one of the trunnions 18. Secured to the disk 73 in any convenient position is a latch button 75 attached to a pin 76 which can be pulled outwardly against the compression of a spring (not shown) which normally holds the inner end of the pin in openings in the disk 74. These openings, several of which are shown in dotted outline at 77 in Fig. 1, are so positioned that the inner end of the locking pin 76 will be engaged therein when the stripping unit is in proper operative relation to each of the various surfaces to be stripped.

From the foregoing, it will be apparent that the field of operation of the device disclosed in my copending application aforesaid has been substantially extended so that practically all of the surfaces which are required to be stripped from time to time can be stripped with the one apparatus without danger to the operator. It is only necessary to slide the vacuum tube up or down, rotate it 180° and swing the traversing mechanism which carries it through the proper angle in order quickly to position the stripping unit in correct operative position; the sliding of the vacuum tube and its rotation being facilitated by running the compressed air pipe inside instead of outside the vacuum tube in the zones where the vacuum tube runs through the blocks 35 and 36. The swing of the traversing mechanism on the trunnions does not interfere with the driving mechanism for the carriage screw, and it is only necessary to pull out the latch button 75 and release it when the stripping unit is approximately in the proper position whereupon a slight movement in either direction will lock the stripping unit in the proper position as the pin 76 enters one of the holes in disk 74.

In operation, the wire brushes and the air discharged under pressure from the air nozzles loosen the dirt and fibers with which the working surfaces of the machine become clogged, and the loosened material is carried away through the vacuum tube. Because the wire brush, as shown in Figs. 4, 5 and 6, which is used with the nozzles there shown for stripping the main cylinder and doffer, is slidably mounted on the nozzle and urged into contact with the surface to be stripped by the spring 54, wear on the bristles is automatically taken up. Furthermore, by directing the discharge of compressed air towards or across the inlet to the vacuum tube the efficiency of the device is substantially increased.

What I claim is:

1. In a device adapted for stripping the cylinder and doffer of a garnetting machine the combination with stripping means, of traversing mechanism on which said stripping means is mounted for moving said means back and forth transversely of said machine, trunnions on which said traversing mechanism is mounted adapting said stripping means to be swung about the axis of said trunnions between a position in operative relation to said cylinder and a position in operative relation to said doffer, and driving means for said traversing mechanism including a rotatable driving element coaxial with said trunnions; whereby, said traversing mechanism may be swung about the axes of said trunnions without affecting said driving means.

2. In a device adapted for stripping the cylinder and doffer of a garnetting machine the combination with stripping means, of traversing mechanism, including a level winding carriage screw, on which said stripping means is mounted for moving said means back and forth transversely of said machine, trunnions on which said traversing mechanism is mounted adapting said stripping means to be swung about the axis of said trunnions between a position in operative relation to said cylinder and a position in operative relation to said doffer, and driving means for said traversing mechanism including a rotatable driving element coaxial with said trunnions and a rotatable driven element coaxial with said screw and disposed in planetary relation to said driving element; whereby, said traversing mechanism may be swung about the axis of said trunnions without affecting said driving means.

3. The structure set forth in claim 1 together with means for automatically locking said stripping means when swung into operative relation to said cylinder and said doffer, respectively.

4. The structure set forth in claim 2 together with means for automatically locking said stripping means when swung into operative relation to said cylinder and said doffer, respectively.

5. In a device for stripping the main cylinder and doffer of a garnetting machine, the combination with a stripping unit comprising a vacuum nozzle, a compressed air nozzle, and a brush; of a mounting for said unit; a traversing mechanism cooperating with said mounting for moving said unit back and forth transversely of said machine; a bearing having an axis extending transversely of said machine about which said unit is rotatable between a position in which said vacuum nozzle is directed towards said main cylinder and a position in which said vacuum nozzle is directed towards said doffer, and a latch for automatically locking said vacuum nozzle in said positions when so moved.

6. A device for stripping the workers of a garnetting machine; said device comprising a stripping unit; a traversing mechanism mounted on said machine above and in spaced relation to said workers when said workers are in their normal operating position; a mounting for said stripping unit cooperating with said traversing mechanism for moving said unit back and forth transversely of said machine; a pair of brackets on said machine provided with bearings disposed above and in spaced relation to the normal operating position of said workers and adapted rotatably to support a worker in operative stripping range of said stripping unit when said worker is removed from its normal position and placed in said bearings.

7. A garnett stripping device comprising a vacuum tube having a first, substantially straight nozzle for the intake of air and dirt, and a compressed air nozzle secured thereto and disposed to discharge a jet of compressed air against the surface to be stripped to loosen the dirt thereon to be removed by said vacuum nozzle; a traversing mechanism for moving said device back and forth transversely of said garnett; a curved extension of said first vacuum nozzle having a curved extension of said compressed air nozzle secured thereto and disposed to discharge a jet of compressed air against a surface to be stripped; said curved extensions of said straight nozzles being telescopically interfitted with said straight nozzles; and means detachably securing said extensions thereto; whereby those surfaces of said garnett which cannot be stripped with said straight nozzles may first be stripped with said curved extension nozzles, and said extension nozzles thereafter removed for stripping the remaining surfaces with said straight nozzles.

References Cited in the file of this patent

UNITED STATES PATENTS

| Number | Name | Date |
| --- | --- | --- |
| 789,768 | Sullivan | May 16, 1905 |
| 1,293,798 | Kestner | Feb. 11, 1919 |
| 1,311,293 | Schaefer | July 29, 1919 |
| 1,457,467 | Smith | June 5, 1923 |
| 1,913,016 | Walsh | June 6, 1933 |
| 2,651,080 | Wied | Sept. 8, 1953 |

FOREIGN PATENTS

| Number | Country | Date |
| --- | --- | --- |
| 3,180 | Great Britain | of 1901 |
| 15,415 | Great Britain | of 1903 |
| 20,866 | Great Britain | of 1909 |
| 631,202 | Germany | June 15, 1936 |